United States Patent
Griot et al.

(10) Patent No.: US 9,820,184 B2
(45) Date of Patent: Nov. 14, 2017

(54) METHODS AND APPARATUS FOR SECURE CONNECTIONLESS UPLINK SMALL DATA TRANSMISSION

(71) Applicant: QUALCOMM Incorporated, San Diego, CA (US)

(72) Inventors: Miguel Griot, La Jolla, CA (US); Hao Xu, San Diego, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 14/862,124

(22) Filed: Sep. 22, 2015

(65) Prior Publication Data
US 2016/0088515 A1 Mar. 24, 2016

Related U.S. Application Data

(60) Provisional application No. 62/054,271, filed on Sep. 23, 2014.

(51) Int. Cl.
| | | |
|---|---|---|
| *H04W 12/00* | (2009.01) | |
| *H04W 28/02* | (2009.01) | |
| *H04W 12/04* | (2009.01) | |
| *H04L 29/06* | (2006.01) | |
| *H04W 12/06* | (2009.01) | |
| *H04W 68/02* | (2009.01) | |
| *H04W 76/02* | (2009.01) | |
| *H04W 4/00* | (2009.01) | |
| *H04W 12/02* | (2009.01) | |

(52) U.S. Cl.
CPC ....... *H04W 28/0289* (2013.01); *H04L 63/205* (2013.01); *H04W 12/04* (2013.01); *H04W 4/005* (2013.01); *H04W 12/02* (2013.01); *H04W 12/06* (2013.01); *H04W 68/02* (2013.01); *H04W 76/022* (2013.01)

(58) Field of Classification Search
None
See application file for complete search history.

(56) References Cited

U.S. PATENT DOCUMENTS

| | | | |
|---|---|---|---|
| 7,334,125 B1 * | 2/2008 | Pellacuru | H04L 9/083 380/277 |
| 2005/0169267 A1 | 8/2005 | Choo et al. | |
| 2011/0085497 A1 | 4/2011 | Fang et al. | |

(Continued)

FOREIGN PATENT DOCUMENTS

| | | |
|---|---|---|
| EP | 2387283 A2 | 11/2011 |
| EP | 2770796 A2 | 8/2014 |

OTHER PUBLICATIONS

International Search Report and Written Opinion—PCT/US2015/051622—ISA/EPO—Dec. 21, 2015.

*Primary Examiner* — Chi H Pham
*Assistant Examiner* — Shick Hom
(74) *Attorney, Agent, or Firm* — Patterson & Sheridan, LLP

(57) ABSTRACT

Certain aspects of the present disclosure generally relate to techniques for secure connectionless uplink transmissions by a wireless device. Such techniques may provide for negotiation of an encryption mechanism as part of the setup for connectionless transmissions and subsequent secure connectionless uplink transmissions.

26 Claims, 9 Drawing Sheets

(56) References Cited

U.S. PATENT DOCUMENTS

2013/0201957 A1* 8/2013 Van Phan ............. H04W 4/005
  370/329
2013/0301611 A1 11/2013 Baghel et al.
2014/0254490 A1* 9/2014 Jain ....................... H04B 15/00
  370/328
2016/0150507 A1* 5/2016 Kim ...................... H04W 72/04
  455/450

* cited by examiner

METHODS AND APPARATUS FOR SECURE CONNECTIONLESS UPLINK SMALL DATA TRANSMISSION

CROSS-REFERENCE TO RELATED APPLICATION(S)

This application claims the benefit of U.S. Provisional Application Ser. No. 62/054,271, entitled METHODS AND APPARATUS FOR SECURE CONNECTIONLESS UPLINK SMALL DATA TRANSMISSION, filed Sep. 23, 2014, assigned to the assignee hereof and hereby expressly incorporated by reference herein.

BACKGROUND

I. Field

Certain aspects of the present disclosure generally relate to methods and apparatus for performing secure uplink data transmissions from a user equipment (UE) with reduced signaling overhead.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

Certain types of devices, such as machine-type communications (MTC) devices may have only a small amount of data to send and may send that data relatively infrequently. In such cases, the amount of overhead necessary to establish a network connection may by very high relative to the actual data sent during the connection.

SUMMARY

Certain aspects of the present disclosure provide a method for wireless communications by a user equipment (UE). The method generally includes establishing, via a base station (BS), a secure connection with a network, negotiating, via the secure connection, an encryption mechanism for the UE to use to transmit data without establishing a full radio resource control (RRC) connection, entering an idle mode after negotiating the encryption mechanism, using the negotiated encryption mechanism to encrypt data to be forwarded to the network, and transmitting a packet containing the encrypted data to the BS without establishing the full RRC connection.

Certain aspects of the present disclosure provide an apparatus for wireless communications by a user equipment (UE). The apparatus generally includes at least one processor configured to: establish, via a base station (BS), a secure connection with a network, negotiate, via the secure connection, an encryption mechanism for the UE to use to transmit data without establishing a full radio resource control (RRC) connection, enter an idle mode after negotiating the encryption mechanism, use the negotiated encryption mechanism to encrypt data to be transmitted to the network, and transmit a packet containing the encrypted data to the BS without establishing the full RRC connection, and a memory coupled to the at least one processor.

Certain aspects of the present disclosure provide an apparatus for wireless communications by a user equipment (UE). The apparatus generally includes means for establishing, via a base station (BS), a secure connection with a network, means for negotiating, via the secure connection, an encryption mechanism for the UE to use to transmit data without establishing a full radio resource control (RRC) connection, means for entering an idle mode after negotiating the encryption mechanism, means for using the negotiated encryption mechanism to encrypt data to be forwarded to the network, and means for transmitting a packet containing the encrypted data to the BS without establishing the full RRC connection.

Certain aspects of the present disclosure provide a computer-readable medium for wireless communications by a user equipment (UE). The computer-readable medium generally includes code which when executed by at least one processor, causes the UE to: establish, via a base station (BS), a secure connection with a network, negotiate, via the secure connection, an encryption mechanism for the UE to use to transmit data without establishing a full radio resource control (RRC) connection, enter an idle mode after negotiating the encryption mechanism, use the negotiated encryption mechanism to encrypt data to be transmitted to the network, and transmit a packet containing the encrypted data to the BS without establishing the full RRC connection.

Certain aspects of the present disclosure provide a method for wireless communications by a base station (BS). The method generally includes receiving a packet comprising encrypted data from a user equipment (UE) that has not established a full radio resource control (RRC) connection, communicating with a network entity to perform authentication of the UE, receiving, from the network entity, decryption information for decrypting the encrypted data after the network entity authenticates the UE, and using the decryption information to decrypt the encrypted data.

Certain aspects of the present disclosure provide an apparatus for wireless communications by a base station (BS). The apparatus generally includes at least one processor configured to: receive a packet comprising encrypted data from a user equipment (UE) that has not established a full radio resource control (RRC) connection, communicate with a network entity to perform authentication of the UE, receive, from the network entity, decryption information for decrypting the encrypted data after the network entity authenticates the UE, and use the decryption information to decrypt the encrypted data, and a memory coupled to the at least one processor.

Certain aspects of the present disclosure provide an apparatus for wireless communications by a base station (BS). The apparatus generally includes means for receiving a packet comprising encrypted data from a user equipment (UE) that has not established a full radio resource control (RRC) connection, means for communicating with a network entity to perform authentication of the UE, means for receiving, from the network entity, decryption information for decrypting the encrypted data after the network entity authenticates the UE, and means for using the decryption information to decrypt the encrypted data.

Certain aspects of the present disclosure provide a computer-readable medium for wireless communications by a base station (BS). The computer-readable medium generally includes code which when executed by at least one processor, causes the BS to: receive a packet comprising encrypted data from a user equipment (UE) that has not established a full radio resource control (RRC) connection, communicate with a network entity to perform authentication of the UE, receive, from the network entity, decryption information for decrypting the encrypted data after the network entity authenticates the UE, and use the decryption information to decrypt the encrypted data.

Certain aspects of the present disclosure provide a method for wireless communications by a network entity. The method generally includes establishing, via a base station (BS), a secure connection with a user equipment (UE), negotiating, via the secure connection, an encryption mechanism for the UE to use to transmit data without establishing a full radio resource control (RRC) connection, communicating with the BS to perform authentication of the UE, wherein encrypted data is received in a packet by the BS from the UE, receiving the encrypted data from the BS, and using decryption information to decrypt the encrypted data.

Certain aspects of the present disclosure provide an apparatus for wireless communications by a network entity. The apparatus generally includes at least one processor configured to: establish, via a base station (BS), a secure connection with a user equipment (UE), negotiate, via the secure connection, an encryption mechanism for the UE to use to transmit data without establishing a full radio resource control (RRC) connection, communicate with the BS to perform authentication of the UE, wherein encrypted data is received in a packet by the BS from the UE, receive the encrypted data from the BS, and use decryption information to decrypt the encrypted data, and a memory coupled to the at least one processor.

Certain aspects of the present disclosure provide an apparatus for wireless communications by a network entity. The apparatus generally includes means for establishing, via a base station (BS), a secure connection with a user equipment (UE), means for negotiating, via the secure connection, an encryption mechanism for the UE to use to transmit data without establishing a full radio resource control (RRC) connection, means for communicating with the BS to perform authentication of the UE, wherein encrypted data is received in a packet by the BS from the UE, means for receiving the encrypted data from the BS, and means for using decryption information to decrypt the encrypted data.

Certain aspects of the present disclosure provide a computer-readable medium for wireless communications by a network entity. The computer-readable medium generally includes code which when executed by at least one processor, causes the network entity to: establish, via a base station (BS), a secure connection with a user equipment (UE), negotiate, via the secure connection, an encryption mechanism for the UE to use to transmit data without establishing a full radio resource control (RRC) connection, communicate with the BS to perform authentication of the UE, wherein encrypted data is received in a packet by the BS from the UE, receive the encrypted data from the BS, and use decryption information to decrypt the encrypted data.

Certain aspects of the present disclosure provide a method for wireless communications by a network entity. The method generally includes establishing, via a base station (BS), a secure connection with a user equipment (UE), negotiating, via the secure connection, an encryption mechanism for the UE to use to transmit data without establishing a full radio resource control (RRC) connection, communicating, with the BS that has received a packet from the UE comprising encrypted data, to perform authentication of the UE, providing the BS decryption information for decrypting the encrypted data after authenticating the UE, and receiving, from the BS, data decrypted using the decryption information.

Certain aspects of the present disclosure provide an apparatus for wireless communications by a network entity. The apparatus generally includes at least one processor configured to: establish, via a base station (BS), a secure connection with a user equipment (UE), negotiate, via the secure connection, an encryption mechanism for the UE to use to transmit data without establishing a full radio resource control (RRC) connection, communicate with the BS to perform authentication of the UE, wherein encrypted data is received in a packet by the BS from the UE, provide the BS decryption information for decrypting the encrypted data after authenticating the UE, and receive, from the BS, data decrypted using the decryption information, and a memory coupled to the at least one processor.

Certain aspects of the present disclosure provide an apparatus for wireless communications by a network entity. The apparatus generally includes means for establishing, via a base station (BS), a secure connection with a user equipment (UE), means for negotiating, via the secure connection, an encryption mechanism for the UE to use to transmit data without establishing a full radio resource control (RRC) connection, means for communicating with the BS to perform authentication of the UE, wherein encrypted data is received in a packet by the BS from the UE, means for providing the BS decryption information for decrypting the encrypted data after authenticating the UE, and means for receiving, from the BS, data decrypted using the decryption information.

Certain aspects of the present disclosure provide a computer-readable medium for wireless communications by a network entity. The computer-readable medium generally includes code which when executed by at least one processor, causes the network entity to: establish, via a base station (BS), a secure connection with a user equipment (UE), negotiate, via the secure connection, an encryption mechanism for the UE to use to transmit data without establishing a full radio resource control (RRC) connection, communicate with the BS to perform authentication of the UE, wherein encrypted data is received in a packet by the BS from the UE, provide the BS decryption information for decrypting the encrypted data after authenticating the UE, and receive, from the BS, data decrypted using the decryption information.

Other embodiments include, without limitation, a computer-readable medium comprising code, which when executed by at least one processor, performs one or more aspects of disclosed herein, as well as an apparatus having a processor and memory configured to implement one or more of the aspects disclosed herein.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

Figure 1:
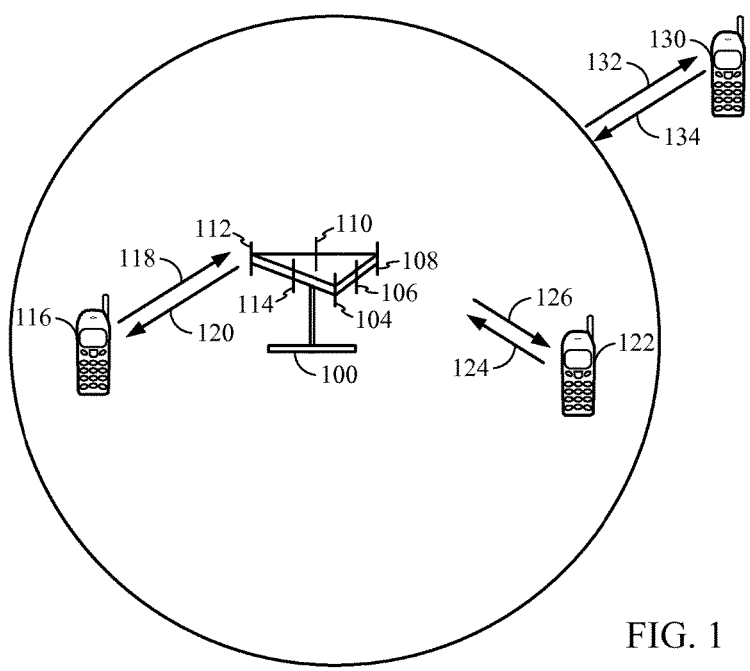
FIG. 1 illustrates an example multiple access wireless communication system in accordance with certain aspects of the present disclosure.

Aspects of the present disclosure provide techniques that may allow certain devices (e.g., machine-type communications (MTC) devices, enhanced MTC (eMTC) devices, etc.) to transmit data without the need to establish a secure connection before transmitting the data. As will be described in greater detail below, these techniques may involve negotiation of an encryption mechanism as part of a setup for a connectionless transmission and subsequent secure connectionless uplink transmissions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) and LTE-Advanced (LTE-A) are newer releases of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). For simplicity, "LTE" refers to LTE and LTE-A.

Single carrier frequency division multiple access (SC-FDMA) is a transmission technique that utilizes single carrier modulation at a transmitter side and frequency domain equalization at a receiver side. SC-FDMA has similar performance and essentially the same overall complexity as those of OFDMA system. However, SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP LTE and Evolved UTRA.

An access point (AP) may comprise, be implemented as, or known as Node B, Radio Network Controller (RNC), eNodeB (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

An access terminal (AT) may comprise, be implemented as, or be known as an access terminal, a subscriber station, a subscriber unit, a mobile station, a remote station, a remote terminal, a remote device, a wireless device, a device, a user terminal, a user agent, a user device, user equipment (UE), a user station, machine-type communications (MTC) device or some other terminology. Examples of MTC devices include robots, drones, various wireless sensors, monitors, detectors, meters, or other type data monitoring, generating, or relaying devices that may be expected to operate (possibly unattended) for years on a single battery charge.

In some implementations, an access terminal may comprise a cellular telephone, a smart phone, a cordless telephone, a Session Initiation Protocol (SIP) phone, a wireless local loop (WLL) station, a personal digital assistant (PDA), a tablet, a netbook, a smartbook, an ultrabook, a handheld device having wireless connection capability, a Station (STA), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), an entertainment device (e.g., a music or video device, a gaming device, a satellite radio), a positioning system device (e.g., GPS, Beidou, GLONASS, Galileo), a wearable device (e.g., smart watch, smart wristband, smart clothing, smart glasses, smart ring, smart bracelet) or any other suitable device that is configured to communicate via a wireless or wired medium. In some aspects, the node is a wireless node. Such wireless node may provide, for example, connectivity for or to a network (e.g., a wide area network (WAN) such as the Internet or a cellular network) via a wired or wireless communication link.

FIG. 1 shows a multiple access wireless communication system, which may be an LTE network, in which aspects of the present disclosure may be practiced.

As illustrated, an access point (AP) 100 may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal (AT) 116 may be in communication with antennas 112 and 114, where antennas 112 and 114 transmit information to AT 116 over forward link 120 and receive information from AT 116 over reverse link 118. AT 122 may be in communication with antennas 104 and 106, where antennas 104 and 106 transmit information to AT 122 over forward link 126 and receive information from AT 122 over reverse link 124. In a FDD (Frequency Division Duplex) system, communication links 118, 120, 124, and 126 may use different frequencies for communication. For example, forward link 120 may use a different frequency than that used by reverse link 118.

Each group of antennas and/or the area in which they are designed to communicate is often referred to as a sector of the AP. In one aspect of the present disclosure, each antenna group may be designed to communicate to ATs in a sector of the areas covered by AP 100.

AT 130 may be in communication with AP 100, where antennas from the AP 100 transmit information to AT 130 over forward link 132 and receive information from the AT 130 over reverse link 134. ATs 116, 122, and 130 may be MTC devices.

In communication over forward links 120 and 126, the transmitting antennas of AP 100 may utilize beamforming in order to improve the signal-to-noise ratio of forward links for the different ATs 116 and 122. Also, an AP using beamforming to transmit to ATs scattered randomly through its coverage causes less interference to ATs in neighboring cells than an AP transmitting through a single antenna to all its ATs.

Figure 8:
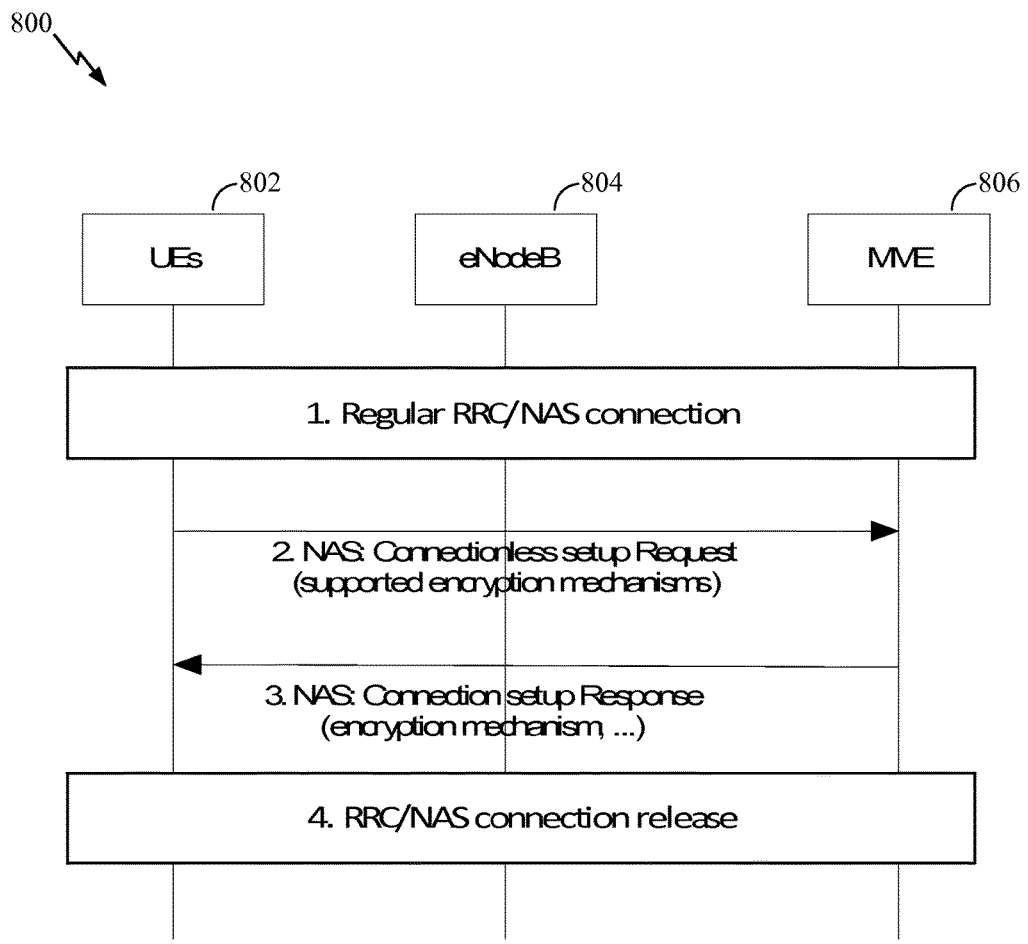
FIG. 8 illustrates an example call flow for the negotiation of an encryption mechanism and setup of a connectionless transmission, in accordance with certain aspects of the present disclosure.
Figure 9:
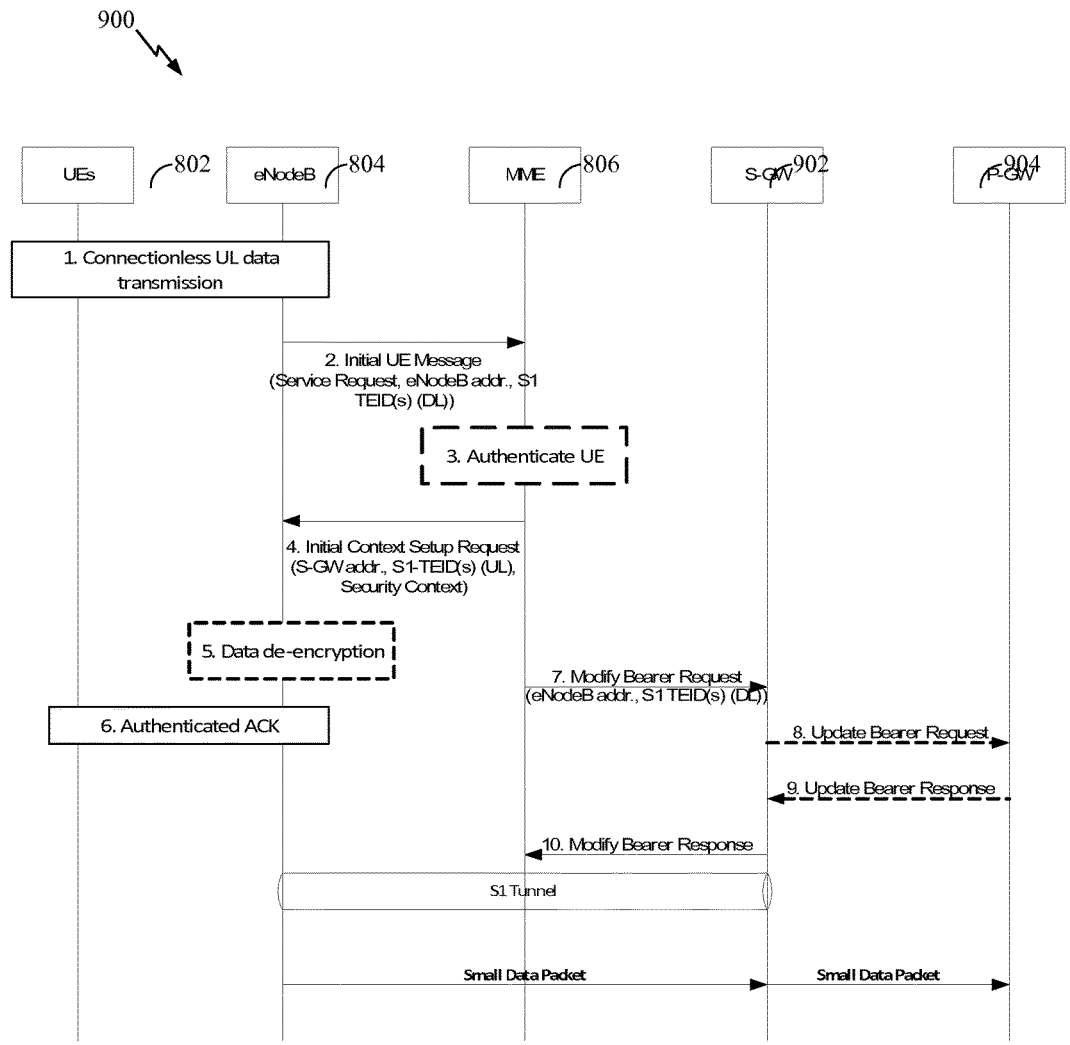
FIG. 9 illustrates an example call flow for a secure connectionless uplink data transmission(s), in accordance with certain aspects of the present disclosure.

According to an aspect, one or more ATs 116, 122, 130 and AP(s) 100 may communicate with the core network (not shown). The AP 100 may be connected by an S1 interface to the core network (not shown). The core network may include a Mobility Management Entity (MME) (e.g., as illustrated in FIGS. 8-9), a Home Subscriber Server (HSS) (not shown), a Serving Gateway (S-GW) (e.g., as illustrated in FIG. 9) and a Packet Data Network (P-GW) Gateway (e.g., as illustrated in FIG. 9). The MME is the control node that processes the signaling between the AT and the core network. The MME may also perform various functions such as mobility management, bearer management, distribution of paging messages, security control, authentication, gateway selection, etc. The HSS is connected to the MME and may perform various functions such as authentication and authorization of the AT and may provide location and IP information to the MME. The S-GW may transfer user IP packets to the P-GW and may perform various functions such as packet routing and forwarding, mobility anchoring, packet buffering, initiation of network-triggered services, etc. The P-GW is connected to the Operator's IP Services (now shown) and may provide UE IP address allocation as well as other functions. The Operator's IP Services may include the Internet, the Intranet, an IP Multimedia Subsystem (IMS), and a PS Streaming Service (PSS).

According to certain aspects presented herein, as will be described in further detail below, the ATs (e.g., illustrated in FIG. 1) may transmit data without the need to establish a secure connection via the AP to the network (e.g., the MME, S-GW, P-GW, etc., illustrated in FIGS. 8-9) before transmitting the data.

Figure 2:
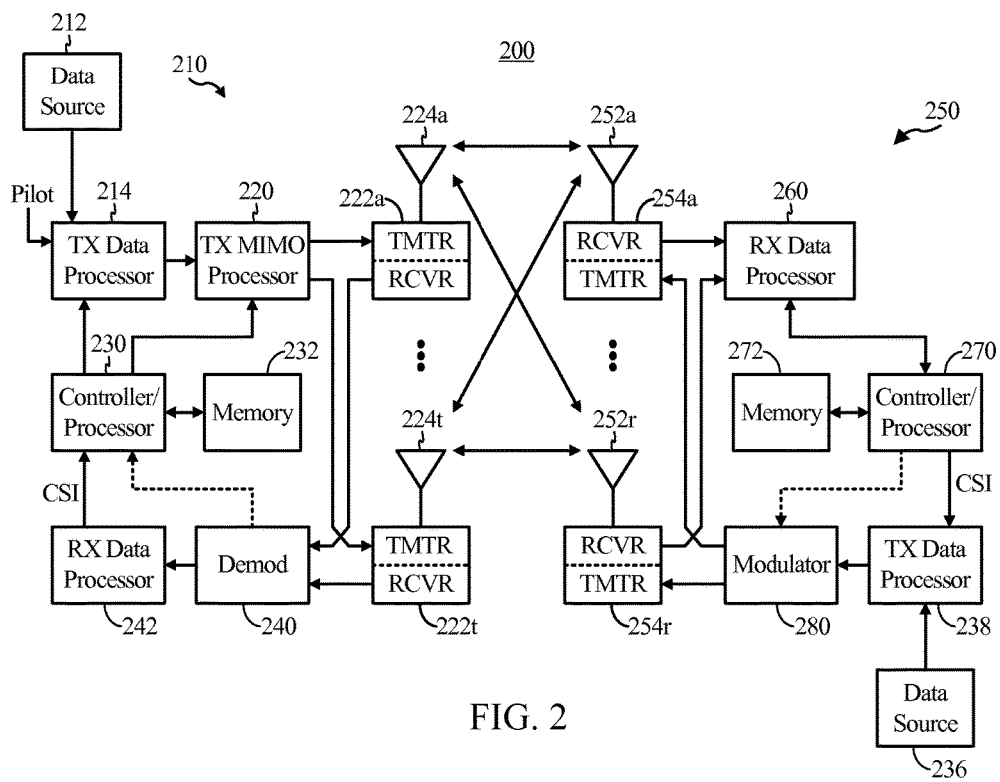
FIG. 2 illustrates a block diagram of an access point and a user terminal in accordance with certain aspects of the present disclosure.

FIG. 2 illustrates a block diagram of an aspect of a transmitter system 210 (e.g., also known as the AP) and a receiver system 250 (e.g., also known as the AT) in a multiple-input multiple-output (MIMO) system 200, according to aspects of the present disclosure. The transmitter system 210 may be configured to perform BS-side operations described below with reference to FIG. 6, while receiver system 250 may be configured to perform UE-side operations described below with reference to FIG. 5.

Each of system 210 and system 250 has capabilities to both transmit and receive. Whether system 210 or system 250 is transmitting, receiving, or transmitting and receiving simultaneously depends on the application. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by controller/processor 230. Memory 232 may store data and software/firmware for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

A receive (RX) data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A controller/processor 270 periodically determines which pre-coding matrix to use. Controller/processor 270 formulates a reverse link message comprising a matrix index portion and a rank value portion. Memory 272 may store data and software/firmware for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Controller/processor 230 then determines which pre-coding matrix to use for determining the beamforming weights, and then processes the extracted message.

According to certain aspects, the controllers/processors 230 and 270 may direct the operation at the transmitter system 210 and the receiver system 250, respectively. For example, the controller/processor 270, TX data processor 238, RX data processor 260, and/or other controllers, processors and modules at the receiver system 250 may be configured to perform or direct operations described below with reference to FIG. 5 and/or other operations for the techniques described herein. According to another aspect, the controller/processor 230, TX data processor 214, RX data processor 242, and/or other controllers, processors and modules at the transmitter system 210 may be configured to perform or direct operations described below with reference to FIG. 6 and/or other operations for the techniques described herein.

Figure 3:
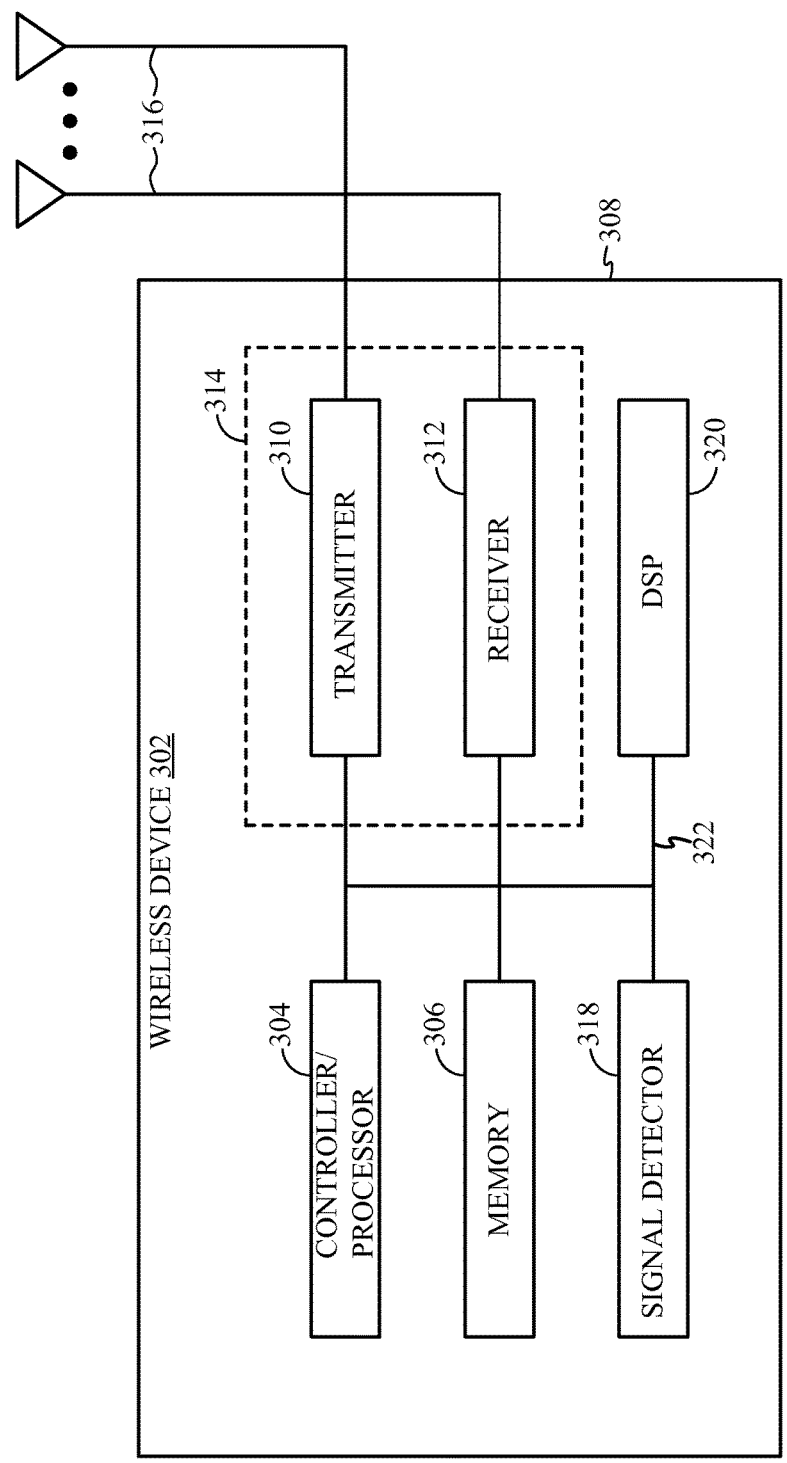
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be an access point (e.g., AP 100 illustrated in FIG. 1), any of the access terminals (e.g., ATs 116, 122 and 130 illustrated in FIG. 1), or a network entity (e.g., MME illustrated in FIGS. 8-9).

The wireless device 302 may include a controller/processor 304 that controls operation of the wireless device 302. The controller/processor 304 may also be referred to as, e.g., a central processing unit (CPU). Memory 306, which may include read-only memory (ROM), random access memory (RAM), flash memory, phase change memory (PCM), provides instructions and data to the controller/processor 304. A portion of the memory 306 may also include non-volatile random access memory (NVRAM). The controller/processor 304 typically performs logical and arithmetic operations based on program instructions stored within the memory 306. The instructions in the memory 306 may be executable to implement the methods described herein, for example, to allow a UE to securely transmit data during an uplink connectionless transmission.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus. The controller/processor 304 may be configured to access instructions stored in the memory 306 to perform the procedures for secure connectionless uplink data transmission, in accordance with certain aspects of the present disclosure discussed below.

Figure 4:
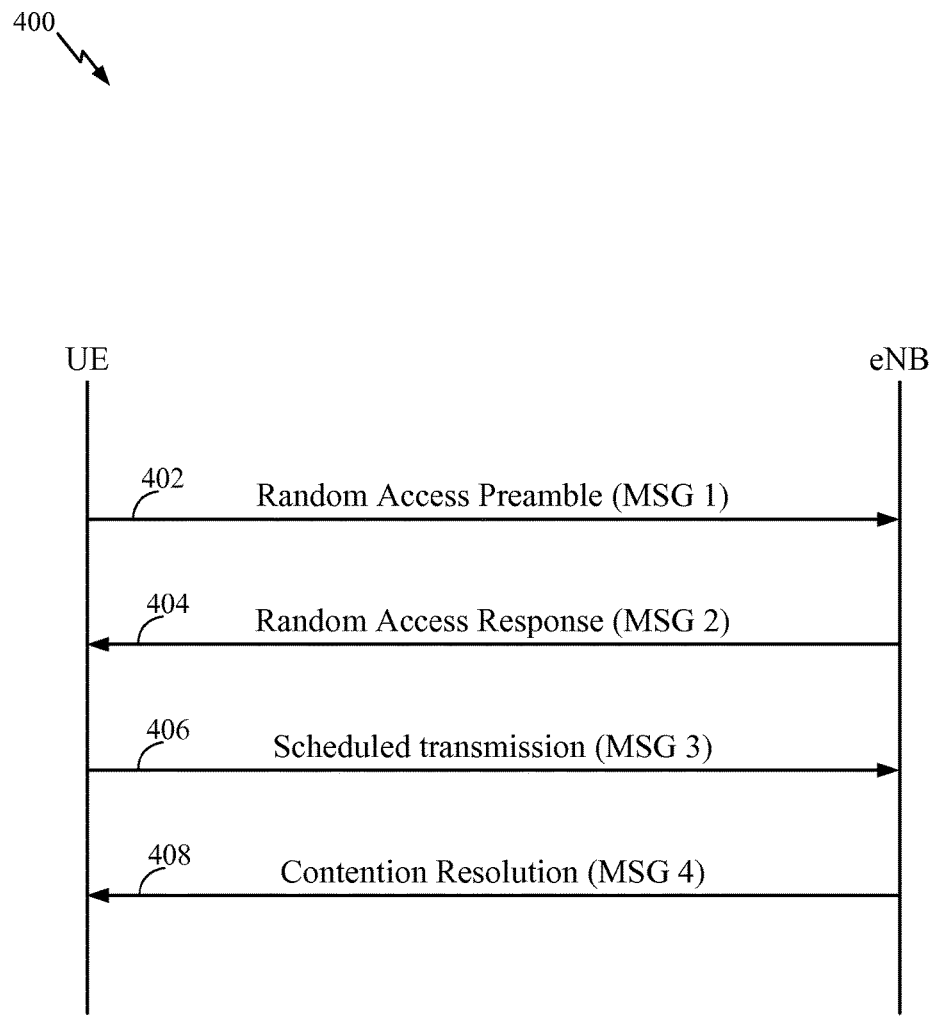
FIG. 4 illustrates a message flow for an LTE RACH contention-based procedure, in accordance with certain aspects of the present disclosure.

FIG. 4 illustrates a message flow 400 for an example LTE RACH contention-based procedure, in accordance with certain aspects of the present disclosure. At 402, a UE may send a preamble (MSG 1), assuming an initial Timing Advance of zero for FDD. Typically, a preamble is randomly chosen by the UE among a set of preambles allocated on the cell and may be linked to a requested size for MSG 3. At 404, an eNB may send a random access response (RAR) or MSG2. MSG 2 may also indicate a grant for MSG 3. At 406, the UE may send MSG 3 using the grant. At 408, the eNB may decode MSG 3 and either echo back the RRC (Radio Resource Control) signaling message or send an UL grant (e.g., DCI 0) scrambled with a cell radio network temporary identifier (C-RNTI).

As noted above, certain types of devices, such as machine-type communications (MTC) devices and enhanced MTC (eMTC) devices, etc., may be expected to be in a low power state (e.g., an idle state) for most of the time. However, in general, each time a mobile terminated (MT) or mobile originated (MO) data connection is required, the device transitions from the idle state to a connected state.

This transition typically entails several steps: random access and contention resolution, radio resource control (RRC) connection setup, service request, security activation, data radio bearer (DRB) establishment, and the actual data transmission and reception. For certain devices (e.g., MTC devices, etc.), generally the above signaling overhead is often much larger than the amount of data being exchanged. Moreover, in certain aspects, the device may not transition back to the idle state until data is transmitted and received. For example, in certain situations, the device may have to wait for an acknowledgement (ACK) before transitioning to the idle state, which is not power efficient.

Accordingly, reducing the signaling overhead when transitioning from an idle mode to transmit and/or receive data may reduce the amount of power consumption. According to certain aspects presented herein, a UE (e.g., a MTC device, AT(s) illustrated in FIG. 1, etc.) may perform a connectionless access transmission so that the UE may transmit data without the overhead associated with entering a RRC connected mode. According to certain aspects, the connectionless access mode may allow for fast transitions without requiring full RRC connection setup. According to another aspect, the RACH procedure (e.g., illustrated in FIG. 4) may be modified to provide for connectionless access.

As described above, according to certain aspects, in order to reduce the amount of signaling overhead associated with a data transmission, the UE may transmit data without the overhead of first establishing a connection (referred to herein as a connectionless access transmission), which may reduce power consumption. In some cases, however, connectionless transmission may not be secure. For example, according to certain aspects, when the UE transmits a message (e.g., using connectionless access transmission), the UE and/or the network may not yet be authenticated.

Aspects of the present disclosure, however, allow a UE to negotiate an encryption mechanism prior to sending a connectionless transmission. For example, connectionless transmission is only used after successful negotiation. The UE may then use this encryption mechanism to encrypt the data sent in the connectionless transmission. A base station (e.g., eNB) may then take steps to authenticate the UE with the network (e.g., mobility management entity (MME)) and receive information (e.g., key, sequence number, etc.) it may then use to decrypt the encrypted data.

Accordingly, aspects of the present disclosure may allow for the secure transmission of data without the need to establish a secure connection (e.g., with the network) before transmitting the data.

Figure 5:
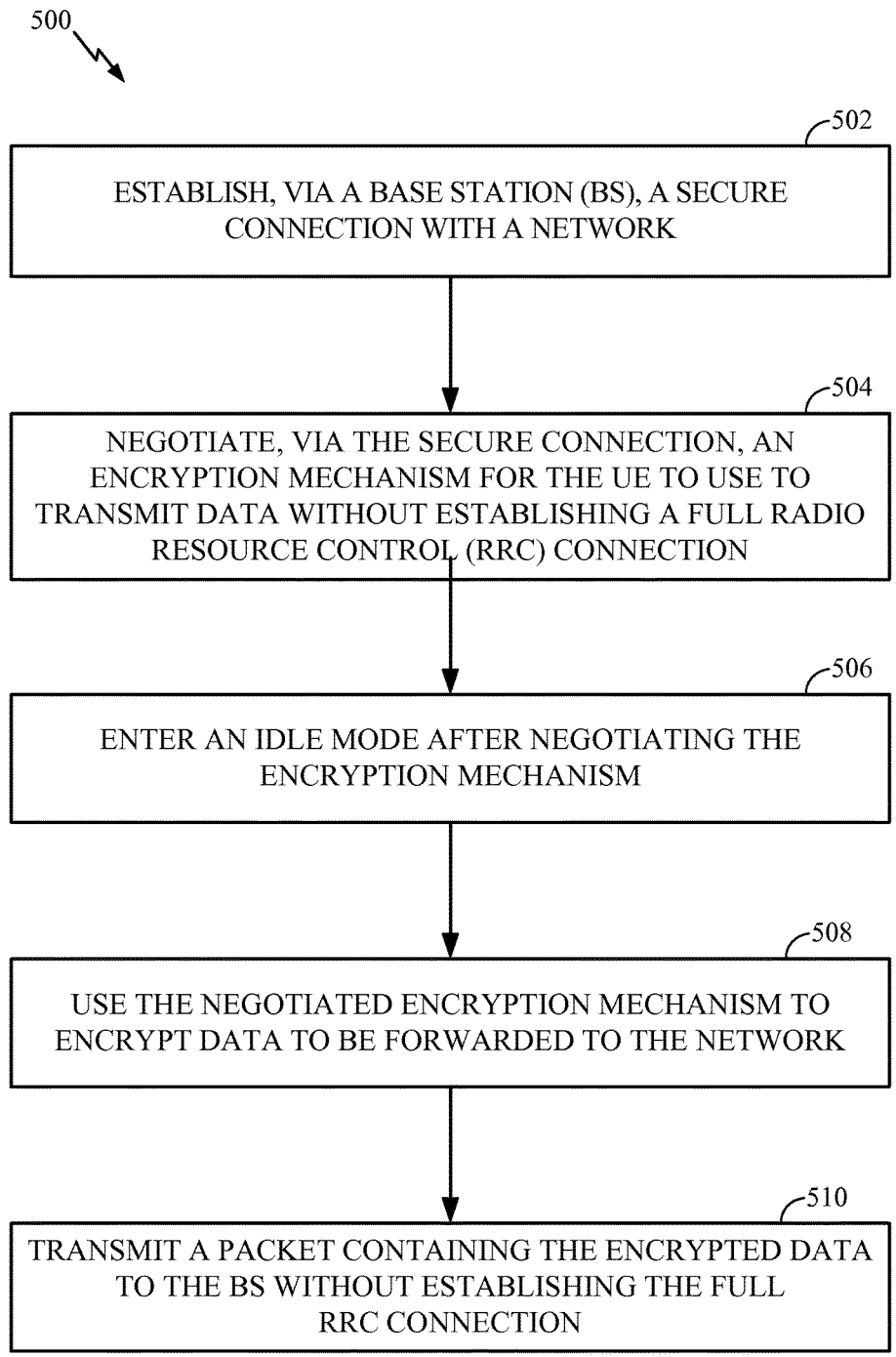
FIG. 5 illustrates example operations that may be performed by a UE, in accordance with certain aspects of the present disclosure.
Figure 6:
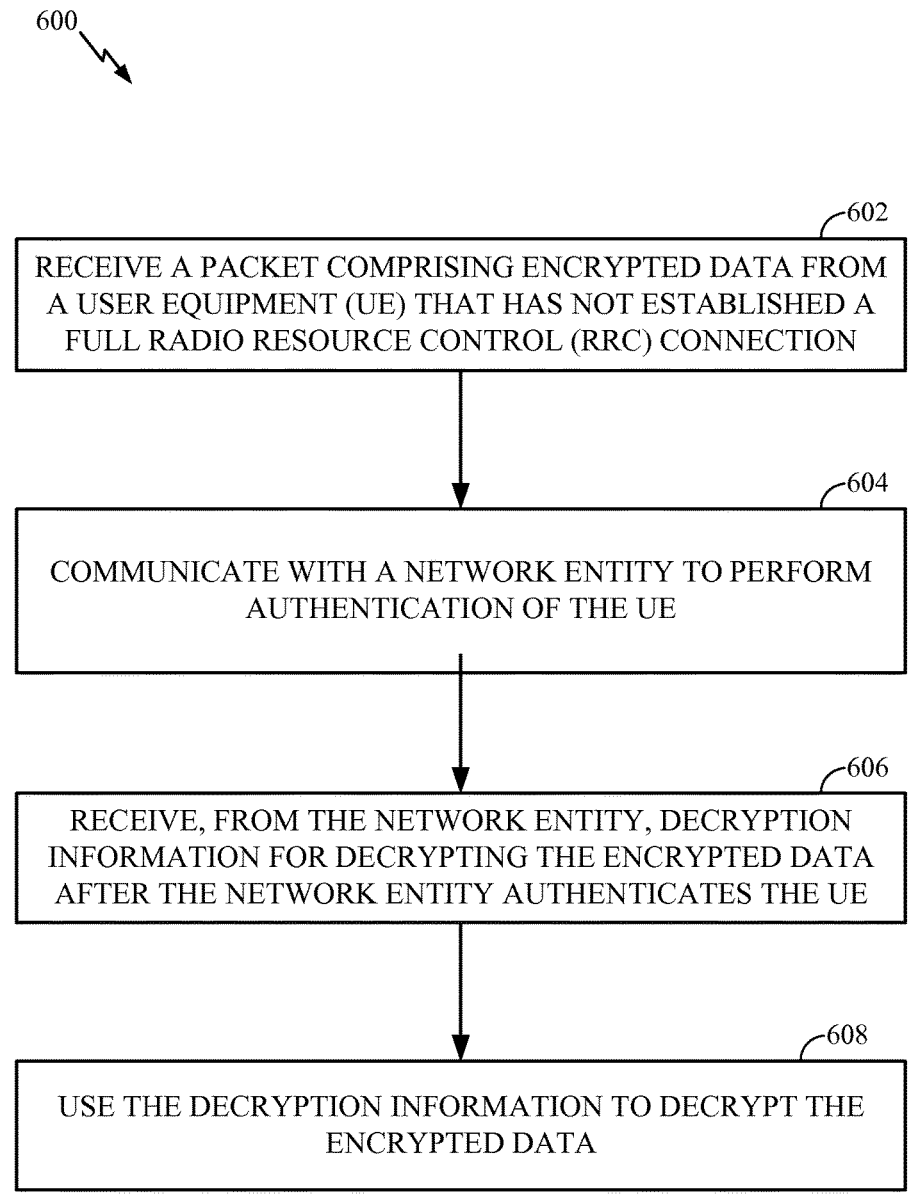
FIG. 6 illustrates example operations that may be performed by a base station (BS), in accordance with certain aspects of the present disclosure.
Figure 7:
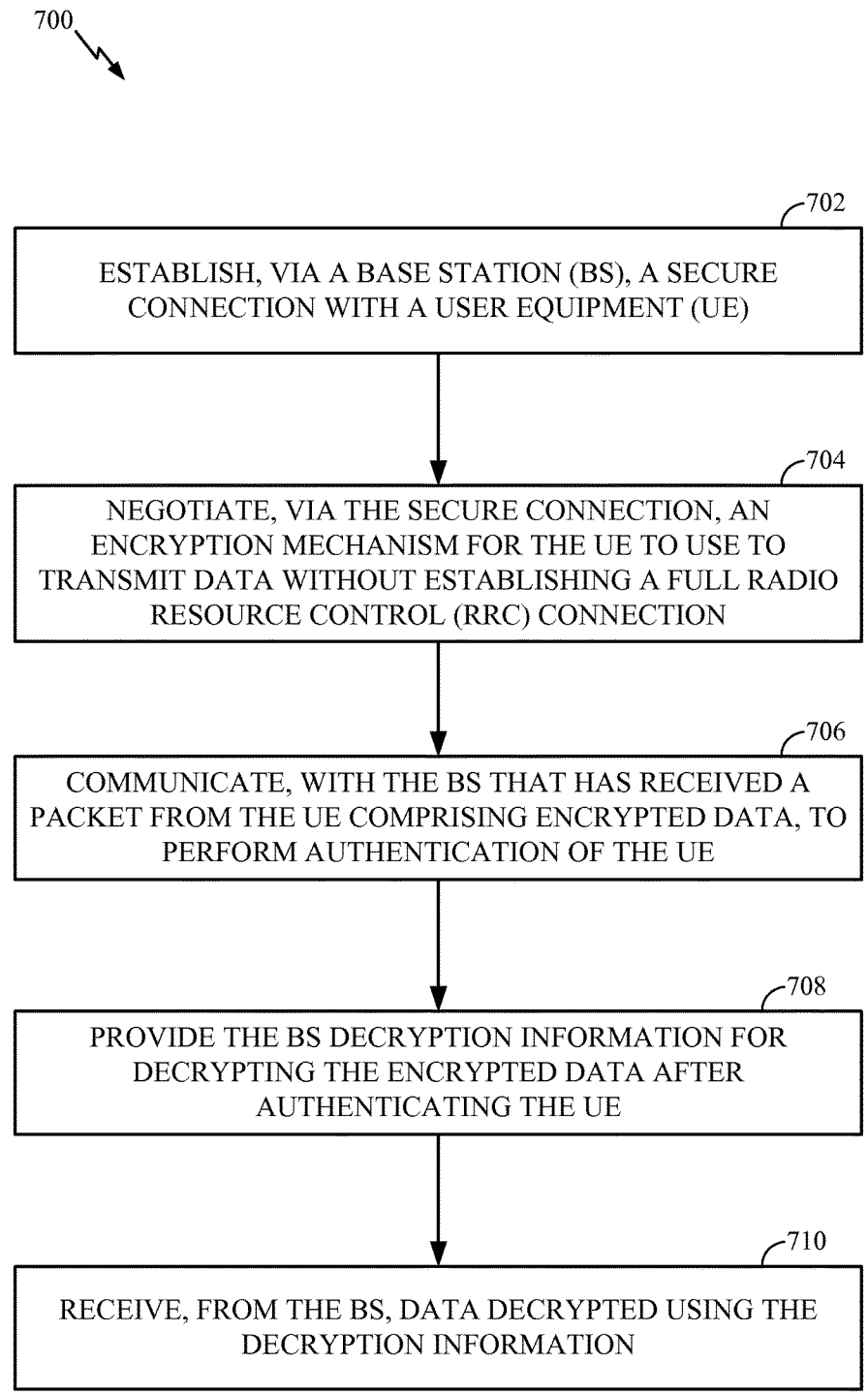
FIG. 7 illustrates example operations that may be performed by a network entity, in accordance with certain aspects of the present disclosure.

FIGS. 5, 6, and 7 illustrate example operations that may be performed by different entities involved in a secure connectionless transmission.

For example, FIG. 5 illustrates example operations 500 for secure connectionless data transmission that may be performed, for example, by a UE (e.g., a MTC device, AT 116 in FIG. 1, receiver system 250 in FIG. 2, or wireless device 302 in FIG. 3, etc.).

At 502, the UE establishes, via a base station (BS), a secure connection with a network. At 504, the UE negotiates, via the secure connection, an encryption mechanism for the UE to use to transmit data without establishing a full radio resource control (RRC) connection. At 506, the UE enters an idle mode after negotiating the encryption mechanism. At 508, the UE uses the negotiated encryption mechanism to encrypt data to be forwarded to the network. At 510, the UE transmits a packet containing the encrypted data to the BS without establishing the full RRC connection.

FIG. 6 illustrates example operations 600 that may be performed, for example, by a BS (e.g., to provide for secure connectionless data transmission by a UE). According to certain aspects, the BS may be the AP 100 in FIG. 1, transmitter system 210 in FIG. 2, wireless device 302 in FIG. 3, etc.

At 602, the BS receives a packet comprising encrypted data from a user equipment (UE) that has not established a full radio resource control (RRC) connection. At 604, the BS communicates with a network entity to perform authentication of the UE. At 606, the BS receives, from the network entity, decryption information for decrypting the encrypted data after the network entity authenticates the UE. At 608, the BS uses the decryption information to decrypt the encrypted data.

FIG. 7 illustrates example operations 700 that may be performed, for example, by a network entity to provide for secure connectionless data transmission by a UE. According to certain aspects, the network entity may be a MME (e.g., illustrated in FIGS. 8-9).

At 702, the MME establishes, via a base station (BS), a secure connection with a user equipment (UE). At 704, the MME negotiates, via the secure connection, an encryption mechanism for the UE to use to transmit data without establishing a full radio resource control (RRC) connection. At 706, the MME communicates, with the BS that has received a packet from the UE comprising encrypted data, to perform authentication of the UE. At 708, the MME provides the BS decryption information for decrypting the encrypted data after authenticating the UE. At 710, the MME receives, from the BS, data decrypted using the decryption information. As will be described in greater detail below with reference to FIG. 10, in some cases, an MME and S-GW may be a single network entity and, rather than provide decryption information to the BS, the entity may receive encrypted data from the BS and decrypt it using the decryption information.

As mentioned above, according to certain aspects, before the UE transmits a secure connectionless data transmission, the UE may first negotiate with the MME (e.g., via the BS) for negotiation of an encryption mechanism as part of the setup for connectionless transmission. According to certain aspects, the connectionless uplink data transmission may only be attempted after a successful negotiation and/or setup of the connectionless transmission.

FIG. 8 illustrates an example call flow diagram 800 that shows an exchange of messages between a UE 802, BS 804 and MME 806 (e.g., network entity) for negotiation of an encryption mechanism as part of a setup for connectionless transmission, in accordance with aspects of the present disclosure. The UE 802 may be any of a MTC device, AT 116 in FIG. 1, receiver system 250 in FIG. 2, or wireless device 302 in FIG. 3, etc. The BS 804 may be the AP 100 in FIG. 1, transmitter system 210 in FIG. 2, wireless device 302 in FIG. 3, etc.

According to certain aspects, as shown in step 1 of FIG. 8, the UE 802 and MME 806 (e.g., network entity) may establish a secure connection, for example, via the eNodeB (eNB) 804. In certain aspects, the secure connection may consist of a RRC connection and/or secure non-access stratum (NAS) connection, implemented in accordance with existing standards (e.g., for 3GPP LTE, etc.). For example, the secure connection may comprise at least one of a tracking area update (TAU) mechanism and/or attach procedure. In another aspect, the secure connection may be implemented utilizing a new procedure (e.g., not defined by current standards).

As shown in steps 2 and 3 of FIG. 8 and described above with respect to FIGS. 5 and 7, the UE 802 and MME 806 may negotiate, via the secure connection, an encryption mechanism for the UE to use to transmit data without establishing a full RRC connection. For example, as illustrated in step 2 of FIG. 8, the UE 802 may transmit, to the MME 806, a connectionless setup request containing a list of one or more encryption mechanisms supported by the UE 802 for connectionless transmission. Once the MME 806 receives the connectionless setup request, the MME 806 may transmit a connection setup response comprising at least an indication of the encryption mechanism to be used for connectionless transmission (e.g., as shown in step 3 of FIG. 8). The indicated encryption mechanism may be information related to one of the encryption mechanisms supported by the UE 802 and listed in the request (e.g., an initial sequence number, keys, etc.). In some cases, however, the connectionless setup response may indicate an encryption mechanism other than one listed by the UE in the request.

According to certain aspects, as shown in step 4 of FIG. 8, if the MME 806 and UE 802 successfully negotiated (e.g., the MME accepted the connectionless setup request) for the encryption mechanism as part of the setup for the connectionless transmission, the connection may be released and the UE 802 may enter an idle mode. The UE 802 may attempt to use the connectionless transmission after successful negotiation (e.g., for some period of time or until indicated otherwise). The UE 802 may use the connectionless transmission to transmit data without establishing a full RRC connection between the UE 802 and the MME 806. For example, in one embodiment, the UE 802 may transmit data using the connectionless transmission without entering RRC connected mode. In one embodiment, the UE 802 may transmit data using the connectionless transmission without establishing at least one data radio bearer between the UE 802 and the MME 806. Alternatively, if the MME 806 rejected or ignored the request from the UE 802, the UE 802 may not attempt to use connectionless transmission. Steps 3 and 4 may include stand-alone messages or messages that are piggy-backed onto existing messages.

According to aspects provided herein, the connectionless setup request message and connectionless setup response message may be provided as a part of existing NAS messages or may be provided via new messages. According to another aspect, the successful negotiation of the encryption mechanism and/or setup for connectionless transmission may be valid for some period of time. For example, the successful negotiation may expire upon the expiration of an expiration time (e.g., 24 hours, 48 hours, etc.), may expire once the UE goes outside of a designated area from the eNB and/or network, or some other criteria (e.g., the network may revoke the negotiated encryption mechanism at any time).

FIG. 9 illustrates an example call flow diagram 900 for secure connectionless UL data transmission (e.g., assuming operations shown in FIG. 8 have been performed). As described above (e.g., with respect to FIG. 8), in one aspect, the UE 802 may not attempt a secure connectionless UL data transmission until after a successful negotiation of an encryption mechanism as part of the setup for connectionless transmission. The operations of FIG. 9 can happen multiple times without the initial negotiation as in FIG. 8.

According to certain aspects, as described above, after successful negotiation of the encryption mechanism, the UE 802 may use the negotiated encryption mechanism to encrypt the data to be forwarded to the network (e.g., via the eNB). In an aspect, the UE 802 may then request resources from the eNB 804 to transmit the packet containing the encrypted data. Accordingly, as shown in step 1 of FIG. 9, if the eNB 804 provides the UE 802 with the requested resources, the UE 802 may then transmit a packet containing the encrypted data to the eNB 804 using the connectionless transmission. According to an aspect, the UE 802 may use the connectionless transmission by transmitting the packet without establishing the full RRC connection (e.g., without establishing any data radio bearers between the UE and the MME 806, not entering RRC connection mode, etc.). According to another aspect, the packet may be transmitted as part of a service request.

In some cases, the transmitted packet containing the encrypted data may comprise a mechanism or means for the network to authenticate the UE 802. For example, the mechanism or means may include at least one of a medium access control (MAC) or short MAC address of the UE 802.

As shown in step 2 of FIG. 9, after receiving a packet comprising encrypted data from the UE 802 that is not in RRC connected mode, the eNB 804 may then communicate with the MME 806 (e.g., a network entity) to perform authentication of the UE 802. For example, as shown in FIG. 9, the eNB 804 may transmit a message to the MME 806 with the authentication information (e.g., MAC or short MAC address of the UE) received from the UE 802. In an aspect, the eNB 804 may also include its address (e.g., eNB address) and/or tunneling information (e.g., S1 TEID(s)(DL) (tunnel endpoint identifiers (downlink)) for user plane transmission.

As shown in step 3 of FIG. 9, once the MME 806 receives the message, from the eNB 804, containing the information (e.g., MAC or short MAC address of the UE) needed to authenticate the UE 802, the MME 806 may authenticate the UE, for example, utilizing the MAC or short MAC address of the UE.

As shown in step 4 of FIG. 9, the MME 806 may then provide decryption information for decrypting the encrypted data to the eNB 804. For example, as shown in FIG. 9, the MME 806 may provide decryption information (e.g., security context) to the eNB 804. In another embodiment, in addition to providing the eNB 804 decryption information, or in the alternative, the MME 806 may use the decryption information to decrypt the encrypted data. In an aspect, the MME 806 may also provide the serving gateway (S-GW) information (e.g., S-GW address) and/or tunneling information (e.g., S1 TEID(s) (UL) (tunnel endpoint identifiers (uplink)) to the eNB. In another aspect, the MME 806 may provide a MAC or short MAC address (to the eNB 804) for the UE 802 to authenticate the network. As shown in step 5 of FIG. 9, the eNB 804 may use the decryption information received from the MME 806 to decrypt the encrypted data (e.g., small data packet, etc.) within the packet transmitted by the UE 802.

As shown in step 6 of FIG. 9, after successfully decrypting the encrypted data, the eNB 804 may send a message (e.g., an acknowledgement (ACK)) to the UE 802 acknowledging that the eNB 804 has successfully decrypted the encrypted data. In certain aspects, this ACK may be an authenticated ACK for the UE 802 to know that it had sent the message to the right network. This secure ACK may be performed by the eNB 804 including the MME provided MAC or short MAC in the ACK. In certain aspects, the message may comprise a paging message (thus allowing the UE to return to idle and wake up to check for paging messages indicating an acknowledgement). In an aspect, the ACK may be included in the paging message, another message and/or separate resource after the paging message. In another aspect, the mere transmission of the paging message, itself, may indicate acknowledgement that the eNB 804 has successfully decrypted the encrypted data. For example, the paging message lets the UE 802 know that the connection is still active (in other words, no re-establishment, for example, using the procedure in FIG. 8 is needed). In yet another aspect, the message may comprise mechanism or means for the UE 802 to authenticate the network. For example, the mechanism or means may include at least one of a MAC or short MAC address. Further, according to yet another aspect, the UE 802 may receive the message while still in idle mode.

According to certain aspects, the UE, after transmitting the packet, may determine that the UE has not received an acknowledgment (ACK) that the eNB 804 has successfully decrypted the encrypted data (or receives an explicit negative acknowledgement-NAK). In any case, the UE 802 may retransmit the packet, in response to the determination.

According to certain aspects, after receiving the service request and authenticating the UE 802, the MME 806, S-GW 902 and P-GW 904 may coordinate to modify and/or update bearers in order to forward the transmitted data packet (e.g., as shown in steps 7-10 of FIG. 9).

Figure 10:
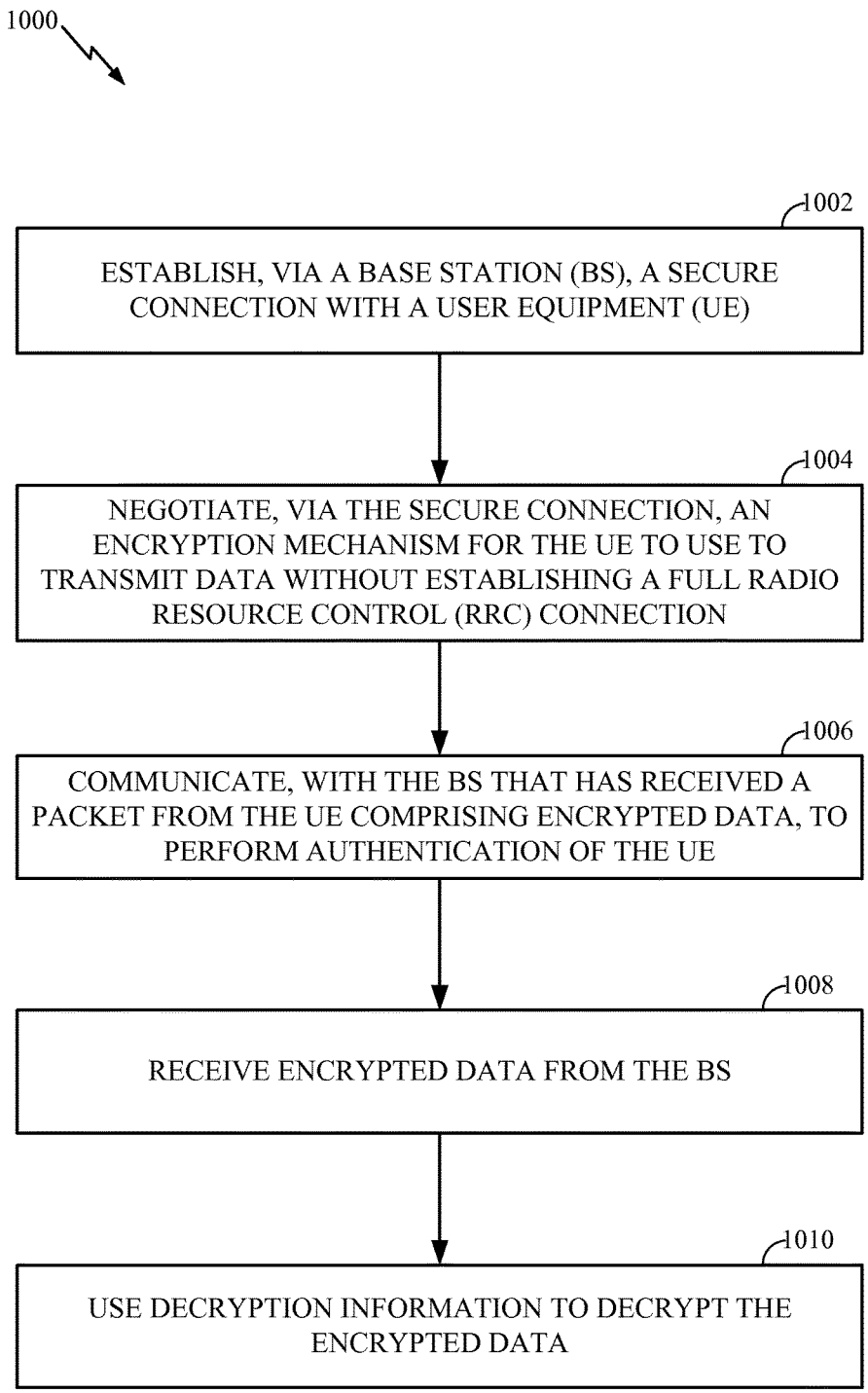
FIG. 10 illustrates example operations that may be performed by a network entity, in accordance with certain aspects of the present disclosure.

Note that the call flow illustrated in FIG. 9 illustrates merely one example of different entities involved in a secure connectionless transmission. For example, in some cases, the MME 806 and S-GW 902 may be a common network entity. In this case, rather than MME 806 sending decryption information to the eNB, the eNB may send encrypted data and the MME/S-GW may decode and decrypt the data using the decryption information. FIG. 10 illustrates example operations 1000 such an entity may perform. As illustrated, operations 1002-1006 may be the same as operations 702-706 of FIG. 7 described above. However, rather than providing the BS decryption information for decrypting the encrypted data after authenticating the UE (per 708) and receiving, from the BS, data decrypted using the decryption information (per 710), the entity may receive encrypted data from the BS (at 1008) and use the decryption information to decrypt the encrypted data (at 1010).

The various operations of methods described above may be performed by any suitable means capable of performing the corresponding functions or operations. The means may include various hardware and/or software/firmware component(s) and/or module(s), including, but not limited to a circuit, an application specific integrated circuit (ASIC), or a processor. Generally, where there are operations illustrated in Figures, those operations may be performed by corresponding functional means capable of performing the operations. In one configuration, the UE 802 includes means for establishing, via a base station (BS), a secure connection with a network, means for negotiating, via the secure connection, an encryption mechanism for the UE to use to transmit data without establishing a full radio resource control (RRC) connection, means for entering an idle mode after negotiating the encryption mechanism, means for using the negotiated encryption mechanism to encrypt data to be forwarded to the network, and means for transmitting a packet containing the encrypted data to the BS without establishing the full RRC connection. In one aspect, the aforementioned means may be the antennas 252, transceivers 254, controller/processor 270, memory 272, transmit data processor 238, receive data processor 260, modulator 280, or combinations thereof, configured to perform the functions recited by the aforementioned means. In one configuration, the eNB 804 includes means for receiving a packet comprising encrypted data from a user equipment (UE) that has not established a full radio resource control (RRC) connection, means for communicating with a network entity to perform authentication of the UE, means for receiving, from the network entity, decryption information for decrypting the encrypted data after the network entity authenticates the UE, and means for using the decryption information to decrypt the encrypted data. In one aspect, the aforementioned means may be the antennas 224, transceivers 222, controller/processor 230, memory 232, transmit data processor 214, transmit MIMO processor 220, receive data processor 242, demodulator 240, or combinations thereof, configured to perform the functions recited by the aforementioned means.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members and duplicate members. As an example, "at least one of: a, b, or c" is intended to cover: a, b, c, a-b, a-c, b-c, a-b-c, aa, abb, abccc, and etc.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software/firmware module executed by a processor, or in a combination of the two. A software/firmware module may reside in any form of storage medium that is known in the art. Some examples of storage media that may be used include random access memory (RAM), read only memory (ROM), flash memory, EPROM memory, EEPROM memory, phase change memory (PCM), registers, a hard disk, a removable disk, a CD-ROM and so forth. A software/firmware module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software/firmware, or a combination thereof. If implemented in software/firmware, the functions may be stored as one or more instructions on a computer-readable medium. A storage media may be any available media that can be accessed by a computer. By way of example, and not limitation, such computer-readable media can comprise RAM, ROM, PCM (phase change memory), EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software/firmware or instructions may also be transmitted over a transmission medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by a user equipment (UE), comprising:
    establishing, via a base station (BS), a secure connection with a network, wherein establishing the secure connection comprises at least one of a tracking area update (TAU) or attach procedure;
    negotiating, via the secure connection, an encryption mechanism for the UE to use to transmit data without establishing a full radio resource control (RRC) connection;
    entering an idle mode after negotiating the encryption mechanism;
    using the negotiated encryption mechanism to encrypt data to be transmitted to the network; and
    transmitting a packet comprising the encrypted data to the BS without establishing the full RRC connection.

2. The method of claim 1, wherein the negotiating comprises:
    transmitting a request for connectionless setup, wherein the request indicates one or more encryption mechanisms supported by the UE; and
    receiving a response indicating one of the supported encryption mechanisms.

3. The method of claim 1, further comprising:
    transmitting, to the BS, a request for resources for transmitting the packet comprising the encrypted data.

4. The method of claim 1, wherein the packet further comprises a mechanism for the network to authenticate the UE, and wherein the mechanism comprises at least one of a medium access control (MAC) or short MAC address.

5. The method of claim 1, wherein establishing the full RRC connection comprises establishing at least one data radio bearer between the UE and the network.

6. The method of claim 1, further comprising, after transmitting the packet, receiving a message acknowledging that the BS has successfully decrypted the encrypted data.

7. The method of claim 6, wherein the message comprises a paging message.

8. The method of claim 7, wherein transmission of the paging message indicates acknowledgement that the BS has successfully decrypted the encrypted data.

9. The method of claim 6, wherein the message comprises a mechanism for the UE to authenticate the network.

10. The method of claim 9, wherein the mechanism comprises at least one of a medium access control (MAC) or short MAC address.

11. The method of claim 1, further comprising, after transmitting the packet:
    determining the UE has not received an acknowledgement that the BS has successfully decrypted the encrypted data; and
    retransmitting the packet in response to the determination.

12. A method for wireless communications by a base station (BS), comprising:
    receiving a packet comprising encrypted data from a user equipment (UE) that has not established a full radio resource control (RRC) connection;
    communicating with a network entity to perform authentication of the UE;
    receiving, from the network entity, decryption information for decrypting the encrypted data after the network entity authenticates the UE;
    using the decryption information to decrypt the encrypted data; and after successfully decrypting the encrypted data, transmitting a message to the UE acknowledging that the BS has successfully decrypted the encrypted data.

13. The method of claim 12, wherein:
the packet further comprises a mechanism for the network entity to authenticate the UE; and
communicating with the network entity to perform authentication of the UE comprises providing the mechanism to the network entity.

14. The method of claim 13, wherein the mechanism comprises at least one of a medium access control (MAC) or short MAC address.

15. The method of claim 12, wherein the message comprises a paging message.

16. The method of claim 15, wherein transmission of the paging message indicates acknowledgement that the BS has successfully decrypted the encrypted data.

17. The method of claim 12, wherein the message comprises a mechanism for the UE to authenticate the network entity, and wherein the mechanism comprises at least one of a medium access control (MAC) or short MAC address.

18. The method of claim 12, wherein the establishment of the full RRC connection comprises an establishment of at least one data radio bearer between the UE and the network entity.

19. A method for wireless communications by a network entity, comprising:
establishing, via a base station (BS), a secure connection with a user equipment (UE);
negotiating, via the secure connection, an encryption mechanism for the UE to use to transmit data without establishing a full radio resource control (RRC) connection, wherein the negotiating comprises:
receiving a request from the UE for connectionless setup, wherein the request indicates one or more encryption mechanisms supported by the UE; and
transmitting a response indicating one of the supported encryption mechanisms;
communicating with the BS to perform authentication of the UE, wherein encrypted data is received in a packet by the BS from the UE;
providing the BS decryption information for decrypting the encrypted data after authenticating the UE; and
receiving, from the BS, data decrypted using the decryption information.

20. The method of claim 19, further comprising:
receiving, from the BS, at least one mechanism in the packet for the network entity to authenticate the UE; and
using the at least one mechanism to authenticate the UE, wherein the at least one mechanism comprises at least one of a medium access control (MAC) or short MAC address.

21. The method of claim 19, wherein establishing the full RRC connection comprises establishing at least one data radio bearer between the UE and the network entity.

22. The method of claim 19, further comprising, after authenticating the UE, providing the BS with at least one mechanism for the UE to authenticate the network entity, wherein the at least one mechanism comprises at least one of a medium access control (MAC) or short MAC address.

23. A method for wireless communications by a network entity, comprising:
establishing, via a base station (BS), a secure connection with a user equipment (UE);
negotiating, via the secure connection, an encryption mechanism for the UE to use to transmit data without establishing a full radio resource control (RRC) connection, wherein the negotiating comprises:
receiving a request from the UE for connectionless setup, wherein the request indicates one or more encryption mechanisms supported by the UE; and
transmitting a response indicating one of the supported encryption mechanisms;
communicating with the BS to perform authentication of the UE, wherein encrypted data is received in a packet by the BS from the UE;
receiving the encrypted data from the BS; and
using decryption information to decrypt the encrypted data.

24. The method of claim 23, further comprising:
receiving, from the BS, at least one mechanism in the packet for the network entity to authenticate the UE; and
using the at least one mechanism to authenticate the UE, wherein the at least one mechanism comprises at least one of a medium access control (MAC) or short MAC address.

25. The method of claim 23, wherein establishing the full RRC connection comprises establishing at least one data radio bearer between the UE and the network entity.

26. The method of claim 23, further comprising, after authenticating the UE, providing the BS with at least one mechanism for the UE to authenticate the network entity, wherein the at least one mechanism comprises at least one of a medium access control (MAC) or short MAC address.

* * * * *